(12) United States Patent
Gibbs

(10) Patent No.: US 7,011,557 B2
(45) Date of Patent: Mar. 14, 2006

(54) AMPHIBIOUS VEHICLE

(75) Inventor: Alan Timothy Gibbs, London (GB)

(73) Assignee: Gibbs Technologies Limited, (GB)

( * ) Notice: Subject to any disclaimer, the term of this patent is extended or adjusted under 35 U.S.C. 154(b) by 14 days.

(21) Appl. No.: 10/451,568

(22) PCT Filed: Feb. 1, 2002

(86) PCT No.: PCT/GB02/00444

§ 371 (c)(1),
(2), (4) Date: Jun. 20, 2003

(87) PCT Pub. No.: WO02/060707

PCT Pub. Date: Aug. 8, 2002

(65) Prior Publication Data

US 2004/0242090 A1    Dec. 2, 2004

(30) Foreign Application Priority Data

Feb. 1, 2001    (GB) .................................... 0102521

(51) Int. Cl.
*B63H 23/24* (2006.01)
(52) U.S. Cl. ..................................... 440/12.51; 440/83
(58) Field of Classification Search .... 440/12.5–12.54, 440/12.57, 83
See application file for complete search history.

(56) References Cited

U.S. PATENT DOCUMENTS

| 2,466,236 | A | * | 4/1949 | Hecker | 440/12.56 |
| 3,942,466 | A | * | 3/1976 | Bunyan | 440/83 |
| 4,607,562 | A | * | 8/1986 | LeBlanc | 89/40.03 |
| 6,610,193 | B1 | * | 8/2003 | Schmitman | 205/628 |

FOREIGN PATENT DOCUMENTS

| DE | 199 26 145 | 12/2000 |
| EP | 0 341 009 | 11/1989 |

* cited by examiner

Primary Examiner—Ed Swinehart
(74) Attorney, Agent, or Firm—Young & Basile, P.C.

(57) ABSTRACT

Amphibious vehicle comprises longitudinally mounted prime mover, transmission, and offset final drive; with drive outputs; and a power take off. Outputs drive front and rear differentials, via optional decouplers. Power take off powers drive tube, independently from co-axial rear propshaft. Tube powers sprockets via belt or chain; gears could be used here. Optional marine decoupler drives shaft, and thus water jet pump. A power train with front wheel drive only; a dead rear axle is provided. A power train with rear wheel drive only; a dead front axle is provided. Prime mover may be offset parallel to centre line; and may be an engine or an electric motor, possibly powered by a fuel cell. The power take off may be in the form of a drive spline.

18 Claims, 4 Drawing Sheets

AMPHIBIOUS VEHICLE

The present invention relates to an amphibious vehicle capable of travel on land and water, and more particularly to an amphibious vehicle in which a conventional automotive transaxle drive arrangement is adapted to drive at least one pair of road wheels and a marine propulsion means.

In some known automotive power train arrangements the prime mover has a power output shaft, typically an engine crankshaft, which is aligned substantially perpendicular to the longitudinal axis of the vehicle. This is known as a transverse engine layout. Normally, the engine will drive a transmission arranged in-line with the axis of the crankshaft and which has all integral final drive and differential offset to the rear of the engine, the differential being connected by drive shafts to the drive wheels of the vehicle. This arrangement is commonly known as a transaxle drive and is usually employed with the engine located towards the front of the vehicle in order to drive the front wheels of a vehicle. It is also known for such transverse power train arrangements to be adapted to provide four wheel drive by having a power take off from the transmission which drives the rear wheels of the vehicle through a rear differential.

FIG. 1 is a schematic plan view of a vehicle, indicated generally at 10, having a such a known four wheel drive transverse engine and transaxle arrangement. As can be seen, an engine 12 is mounted. transversely, that is with the crankshaft of the engine perpendicular to the longitudinal axis of the vehicle, indicated at 15, forward of a pair of front wheels 14, 16 of the vehicle 10. A transmission 18 is mounted in-line with and is driven by the engine 12. Transmission 18 drives a final drive, 20 which is offset to the rear of the vehicle. The final drive, 20 incorporates a differential and the front wheels 14, 16 are driven from the differential by means of respective drive shafts 22, 24 which may comprise CV joints (not shown) as is known in the art.

In order to provide for four wheel drive, the final drive has a drive spline 26 which drives a power take off unit 28. A propeller shaft 30 is connected to the power take off unit 28 and transmits drive to a rear differential 32, from which the rear wheels 34, 36 are driven through respective drive shafts 38, 40.

Four wheel drive, transverse engine, and transaxle drive units of the type shown in FIG. 1 are currently used by several large car manufacturers in the production of private passenger vehicles and are therefore produced in relatively high volumes, which makes the arrangement most procurable for use in an amphibious vehicle. In choosing a power train for a specialised low volume production vehicle, such as an amphibious vehicle, availability is an important factor.

SUMMARY OF THE INVENTION

It is an object of the present invention to provide an amphibious vehicle in which a conventional four wheel drive transverse engine and transaxle unit is adapted to drive at least one pair of road wheels and a marine drive means.

In accordance with the invention, there is provided an amphibious vehicle having a power train comprising a prime mover, transmission, final drive, and a marine propulsion means, the final drive having a power take off, characterised in that: the prime, mover is positioned. with its output drive shaft arranged generally longitudinally of the vehicle and the final drive is arranged to drive at least one pair of road wheels of the vehicle through a differential, and in that the power take off is adapted to drive the marine propulsion means via a drive table.

Preferably, the power take off comprises a drive spline which drivingly engages one end of the drive tube.

Preferably, the final drive is arranged to drive a pair of front wheels of the vehicle through a front differential. Alternatively, the final drive is arranged to drive a pair of rear wheels of the vehicle through a rear differential.

Conveniently, the final drive is arranged to drive two pairs of road wheels of the vehicle, each pair of road wheels being driven through a respective differential.

Advantageously, the drive tube is co-axial with a drive shaft which transmits drive from the final drive to a differential.

Preferably, one or more decoupler(s) is/are provided to allow decoupling of drive to the road wheels, where said decoupler(s) is/are located downstream of the transmission.

Advantageously, the prime mover is positioned such that its output drive shaft is generally in alignment with the longitudinal axis of the vehicle.

The prime mover may be an engine or an electric motor, the motor may be powered by a fuel cell.

Preferably, the final drive comprises at least one drive output, the axis of the at least one drive output being substantially parallel with, but offset laterally from, the axis of the prime mover output drive shaft.

It is an advantage of the present invention that a conventional transverse engine and transaxle drive unit can be utilised and adapted. It is a further advantage that the conventional transverse engine and transaxle drive unit can be positioned between, the front and rear wheels of the amphibious vehicle, and close to the rear of the vehicle, giving a rearward weight bias to the vehicle which is required for an optimum marine performance particularly when planing.

BRIEF DESCRIPTION OF THE DRAWINGS

The invention will now be described, by way of example only, with reference to the Figures of the accompanying drawings in which.

DETAILED DESCRIPTION OF THE PREFERRED EMBODIMENT

Figure 1:
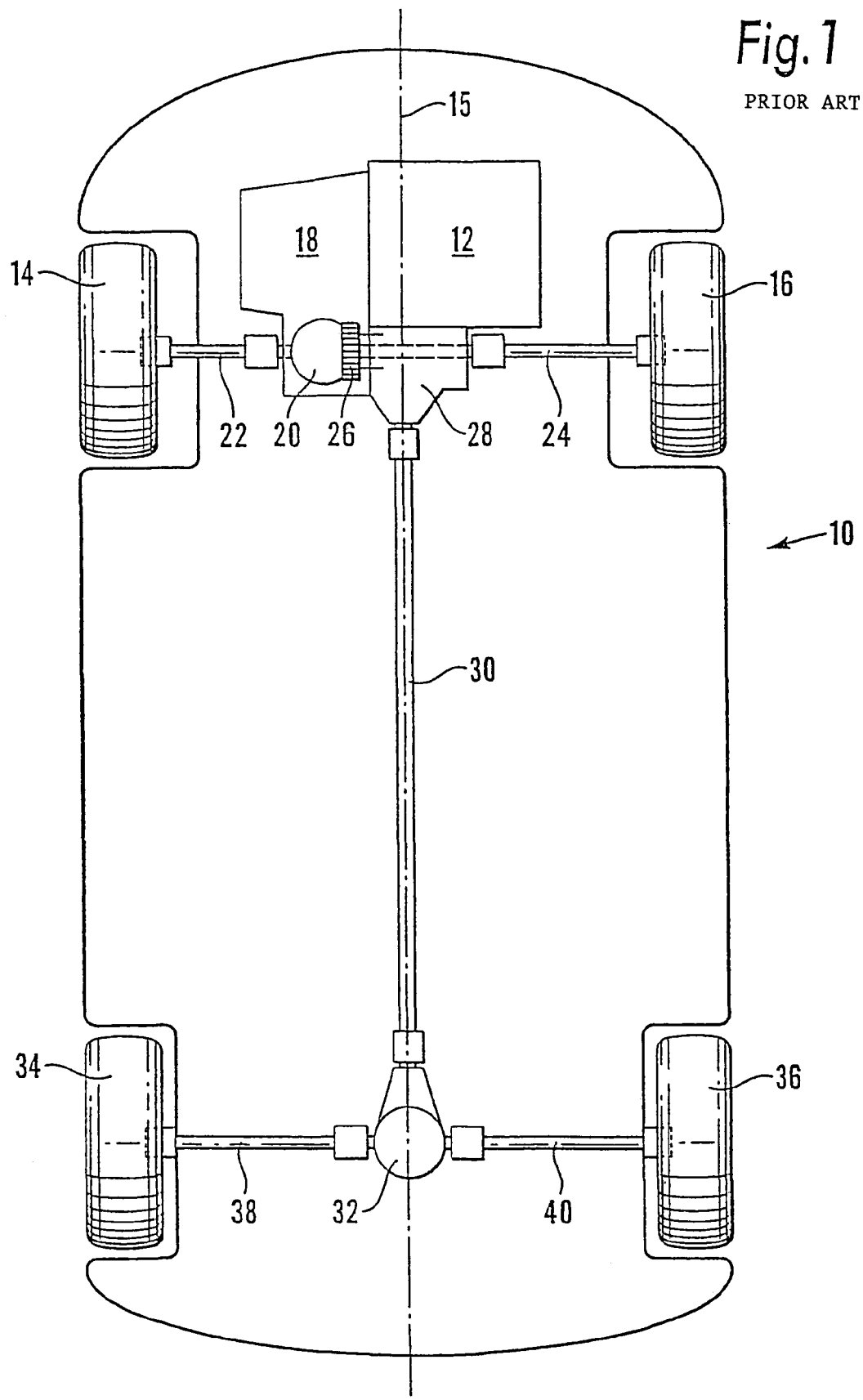
FIG. 1 is a schematic view of a prior art vehicle.
Figure 2:
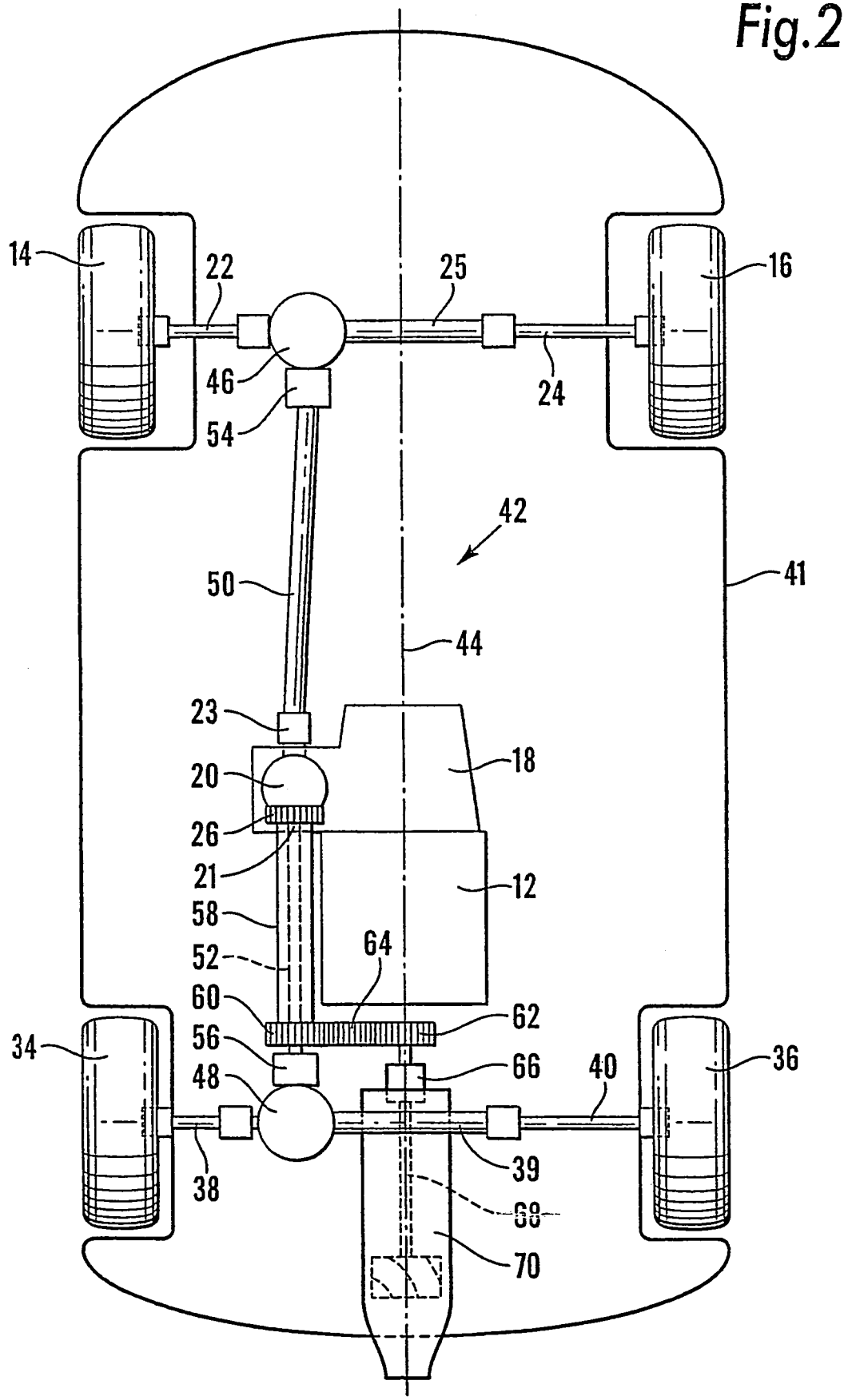
FIG. 2 is a schematic plan view of an amphibious vehicle having a power train in accordance with a first embodiment of the invention.
Figure 3:
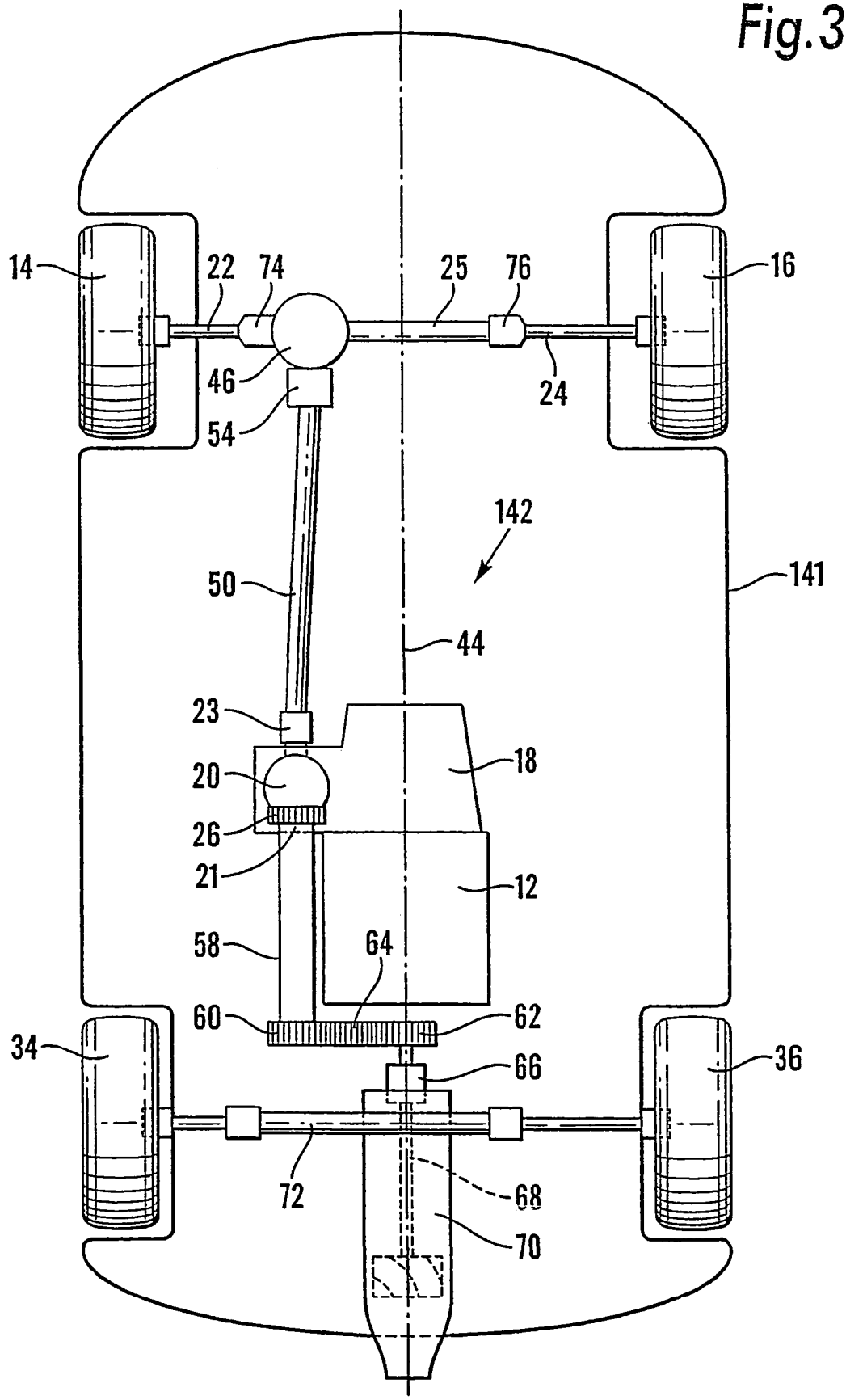
FIG. 3 is a schematic plan view of an, amphibious vehicle having a power train in accordance with a second embodiment of the invention.
Figure 4:
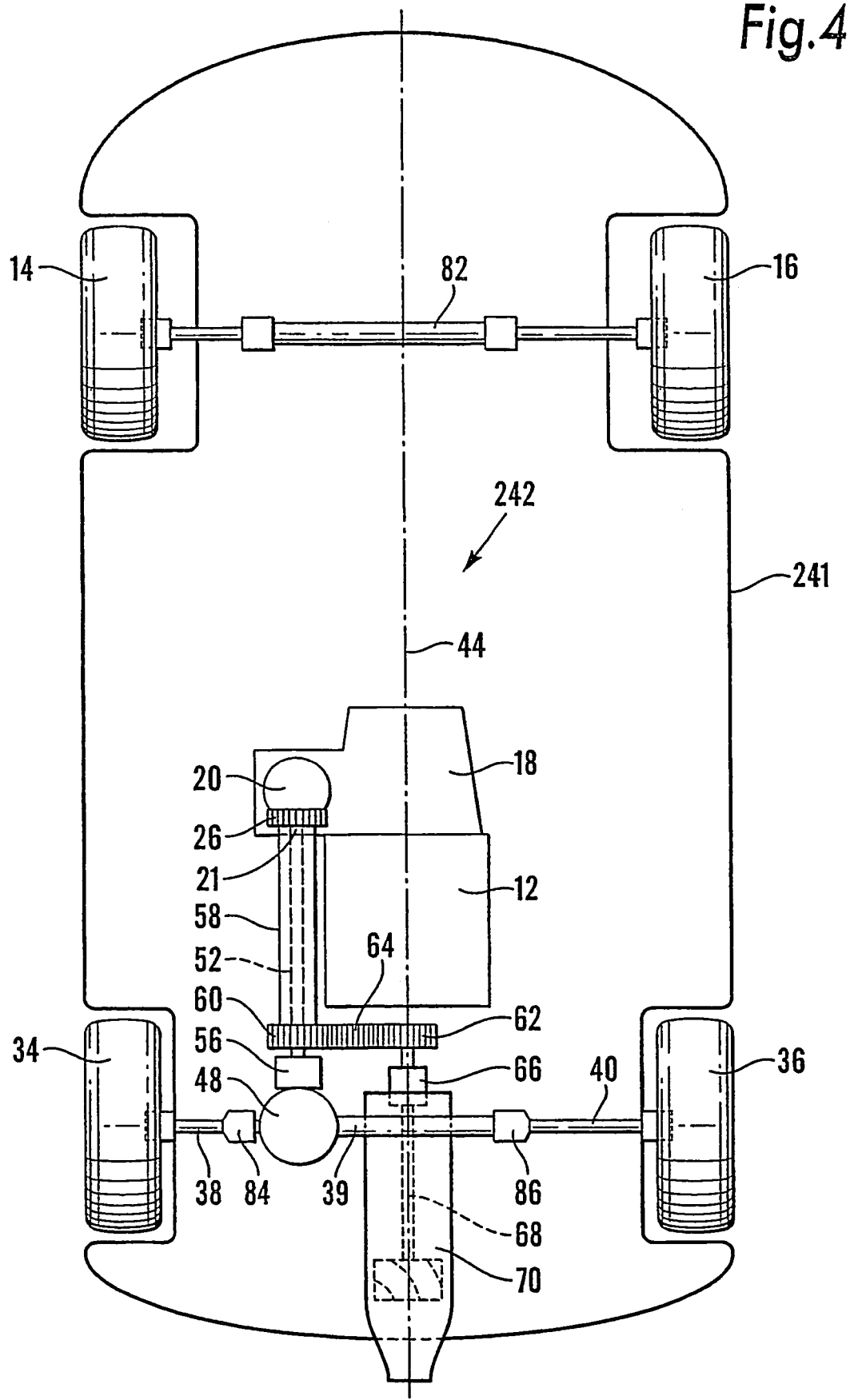
FIG. 4 is a schematic plan view of an amphibious vehicle having a power train in accordance with a third embodiment of the invention.

FIGS. 2 to 4 show various embodiments of an amphibious vehicle in accordance with the invention, in which the conventional engine 12, transmission 18 and final drive 20 arrangement as described in relation to FIG. 1 has been utilised and adapted. Common reference numerals have been used throughout to designate parts in common with parts shown in FIG. 1.

Referring firstly to FIG. 2, there is shown an amphibious vehicle 41 having a power train 42 in which an engine 12, with an in-line transmission 18 and offset final drive 20 are positioned with the crankshaft of the engine in alignment with the longitudinal axis 44 of the vehicle. The final drive 20 incorporates a differential having drive outputs 21, 23. A rear differential 48 is connected to one of the drive outputs 21 by means of a propeller shaft 52 and drives a pair of rear wheels 34, 36 of vehicle through drive shafts 3 8, 40 and relay shaft 39. A forward differential 46 is connected to the other of the drive outputs 23 by a further propeller shaft 50 and drives front wheel propeller shaft 50 and drives front wheels 14, 16, by means of drive shafts 22, 24 and a relay 25. The road wheel drive shafts may comprise CV joints (not shown) as required.

In order to enable selective engagement of drive to the front and rear wheels independently, a front decoupler 54 is positioned in the drive line between the propeller shaft 50 and the front differential 46, and a rear decoupler 56 is positioned. in the drive line between the propeller shaft 52 and the rear differential 48. The front and rear differentials 46,48 can therefore, be selectively coupled and decoupled from the final drive differential 20.

Although not shown, an alternative arrangement for selectively coupling drive to the front and rear wheels independently comprises providing a decoupler in the drive line between each of the front and rear differential 46, 48 and at least one of the road wheels driven by the respective differential. In this alternative arrangement, the decouplers 54, 56 as shown in FIG. 2 are not required, and the front and rear differentials 46, 48 are driven directly from the final drive 20 by their respective propeller shafts 50, 52. Where a decoupler is incorporated into a drive line between a differential and a road wheel, the decoupler may be fitted in series or in combination with a CV joint used in the drive line. For example a combined CV joint and decoupler arrangement such as that disclosed in the applicant's co-pending International patent application PCT/GB01/03493 could be used.

Drive for a marine propulsion means, which in this case is a water jet 70, is also taken from the final drive 20 by means of a drive tube 58 positioned around, and co-axial with the propeller shaft 52, which runs at the side of and parallel with the engine 12. One end of the drive tube 58 is splined, and mates with a drive spline 26 provided on a spline carrier. The spline carrier is arranged concentrically about the drive output 21 of the final drive 20 and the arrangement is such that the drive tube 58 is driven by the drive spline 26 independently of the propeller shaft 52. The other end of the drive tube 58 drives a driving sprocket 60. A sprocket 62 is driven by a belt or chain 64 from the driving sprocket 60, and is connected by a decoupler 66 to a drive shaft 68 of a water jet unit 70. The decoupler 66 enables the driven sprocket to be selectively coupled and decoupled to or from the drive shaft 68, in order to allow drive to the water jet to be disconnected when the vehicle is being operated on land and marine drive is not required.

A bearing (not shown) may be required to locate the rear end of tube 58, and sprocket 60. As an alternative to the sprockets and belt or chain shown, a series of typically three gears could be used to transfer drive from tube 58 to shaft 68. Whilst a water jet is the preferred form of marine propulsion means, this is not essential and the water jet may be replaced with any suitable marine propulsion means, for example a in marine screw propeller.

In this and the other embodiments described below, the final drive has a power takeoff in the form of a drive spline formed on a spline carrier and the drive tube is provided at one end with a corresponding, spline for engagement with the drive spline. However, those skilled in the art will understand that means other than a drive spline can be used to transfer drive from the power take off carrier to the drive tube. For example the carrier and the drive tube could be provided with inter-engagning lugs or gear teeth. Alternatively, the drive tube could be welded, bolted or otherwise secured to the carrier.

Referring now to FIG. 3, a second embodiment of an amphibious vehicle 141 in accordance with the invention comprises a power train 142. The power train arrangement 142 shown in FIG. 3 is generally similar to the power train 42 as described above with reference to FIG. 2, the main difference being that only the front wheels 14, 16 of the vehicle are driven from the final drive 20. Thus, propeller shaft 52, decoupler 56 and rear differential 48 of the FIG. 2 arrangement are omitted, as they are not required in this embodiment. In place of the live, or driven axle shown in FIG. 2, a dead, or non-driven axle 72 is fitted to the rear of the vehicle. Alternatively, the rear wheels can be independently mounted to the vehicle body or chassis.

CV joints 74, 76 are incorporated in the drive line between the front differential 46 and each of the front wheels. Decouplers may be fitted in series or in combination with these CV joints, in order to decouple the front wheels from the transmission during marine use.

Referring now to FIG. 4, a third embodiment of an amphibious vehicle 241 in accordance with the invention comprises a power train 242. The power train arrangement 242 shown in FIG. 4 is generally similar to the power train 42 described above in relation to FIG. 2, the main difference being that only the rear wheels are driven from the final drive 20. Thus, in the power train 242, propeller shaft 50, decoupler 54 and front differential 46 are omitted, as they are not required. In place of the live, or driven axle shown in FIG. 2, a dead, or nondriven axle 82 is fitted to the front of the vehicle. Alternatively, the front wheels can be independently mounted to the vehicle body or chassis, CV Joints 84, 86 are located in the drive line between the rear differential and each of the rear wheels. Decouplers may be fitted in series or in combination with these CV joints, in order to decouple the rear wheels from the transmission during marine use.

In the second and third embodiments described above with respect to FIGS. 3 and 4, if the final drive 20 incorporates a differential, then the differential is locked up so that only the fitted propeller shaft 50 or 52 is driven. It should be noted that either of these arrangements could be suited to a three-wheeled vehicle. Equally, the first embodiment could be adapted to use in a six-wheeled vehicle by use of a tandem rear axle.

In all the embodiments of the invention described above, the prime mover is provided the form of an engine. The engine can be of any suitable type and may comprise a piston engine, a rotary engine or turbine and can be adapted to run on any suitable fuel such as petrol, diesel, gas, or liquid petroleum gas (LPG). However, it should be understood that the invention is not limited to power trains in which the prime mover is an engine but is intended to cover power trains having a prime mover of any suitable type. For example the prime mover could be an electric motor or it could be in the form of a hybrid combination of an engine with an electric motor. Where the prime mover comprises an electric motor, the electric motor could, for example, be powered by a fuel cell.

Whereas the invention has been described in relation to what is presently considered to be the most practical and preferred embodiments, it is to be understood that the invention is not limited to the disclosed arrangements but rather is intended to cover various modifications and equivalent constructions included within the spirit and scope of the invention as defined in the claims. For example, it will be appreciated that further combinations of driven axles and decoupler locations may be selected from the options disclosed above. Also, whilst it is preferred that decouplers are provided in the drive line between the transmission and the driven road wheels, this is not essential and the decouplers, can be omitted. Similarly, whilst it is preferred that a decoupler be provided to enable drive the marine propulsion means to be disconnected when the vehicle is being used in a land mode, this is not essential and the marine propulsion means decoupler can be omitted if desired. Furthermore, whilst in the embodiments described the output shaft of the prime mover is shown in alignment with the longitudinal axis of the vehicle, this need not be the case and the output shaft could be arranged so as to lie generally parallel to, but offset from, the longitudinal axis of the vehicle if required.

The invention claimed is:

1. An amphibious vehicle having a power train comprising;
    a prime mover;
    a transmission;
    a final drive having a power take off;
    and a marine propulsion means; wherein:
    the prime mover is positioned with its output drive shaft arranged generally longitudinally of the vehicle;
    the final drive is arranged to drive at least one pair of road wheels of the vehicle through a drive shaft and differential;
    the power take off is adapted to drive the marine propulsion means via a drive tube that extends alongside the prime mover; and
    and the drive tube is substantially co-axial with said drive shaft which transmits drive from the final drive to said differential.

2. An amphibious vehicle as claimed in claim 1, in which the power take off comprises a drive spline which drivingly engages one end of the drive tube.

3. A power train as claimed in claim 1 in which the final drive is arranged to drive a pair of front wheels of the vehicle through and a front differential.

4. A power train as claimed in claim 1, in which the final drive is arranged to drive a pair of rear wheels of the vehicle through a rear differential.

5. An amphibious vehicle as claimed in claim 1, in which the final drive is arranged to drive two pairs of road wheels of the vehicle, each pair of road wheels being driven through a respective differential.

6. An amphibious vehicle as claimed claim 1, in which at least one decoupler is provided to allow decoupling of drive to the road wheels, where said decoupler is located downstream of the transmission.

7. An amphibious vehicle as claimed in claim 1, in which the prime mover is positioned such that its output drive shaft is generally in alignment with the longitudinal axis of the vehicle.

8. An amphibious vehicle as claimed in claim 1, in which the prime mover is an engine.

9. An amphibious vehicle as claimed in claim 1, in which the prime mover is an electric motor.

10. An amphibious vehicle as claimed in claim 9, in which the electric motor is at least partially powered by a fuel cell.

11. An amphibious vehicle as claimed in claim 1, in which the final drive comprises at least one drive output, the axis of the at least one drive output being substantially parallel with, but offset laterally from, the axis of the prime mover output drive shaft.

12. An amphibious vehicle as claimed in claim 1, in which said drive shaft extends through said drive tube.

13. An amphibious vehicle having a power train comprising:
    a prime mover;
    a transmission;
    a final drive having a power take off;
    a marine propulsion means, wherein the prime mover is positioned with its output drive shaft arranged generally longitudinally of the vehicle;
    the final drive is arranged to drive at least one pair of road wheels of the vehicle through a drive shaft offset laterally from the axis of the prime mover output drive shaft and through a differential;
    the power take off is adapted to drive the marine propulsion means via a drive tube that extends alongside the prime mover; and
    said drive shaft extends from said final drive in a substantially opposite direction to said drive tube.

14. An amphibious vehicle as claimed in claim 13, wherein the power take off comprises a drive spline which drivingly engages one end of the drive tube.

15. A power train as claimed in claim 13, wherein the final drive is arranged to drive a pair of front wheels of the vehicle through said drive shaft and a front differential.

16. An amphibious vehicle as claimed in claim 13, wherein at least one decoupler is provided to allow decoupling of drive to the road wheels, where said decoupler is located downstream of the transmission.

17. An amphibious vehicle as claimed in claim 13, wherein the prime mover is positioned such that its output drive shaft is generally in alignment with the longitudinal axis of the vehicle.

18. An amphibious vehicle as claimed in claim 13, wherein the final drive comprises at least one drive output, the axis of the at least one drive output being substantially parallel with, but offset laterally from, the axis of the prime mover output drive shaft.

* * * * *